US008839928B2

(12) United States Patent
Lundberg et al.

(10) Patent No.: US 8,839,928 B2
(45) Date of Patent: *Sep. 23, 2014

(54) ELECTRO-HYDRAULIC CONTROL SYSTEM FOR A DUAL CLUTCH TRANSMISSION

(75) Inventors: Philip C. Lundberg, Keego Harbor, MI (US); Steven P. Moorman, Dexter, MI (US); Bret M. Olson, Whitelake, MI (US); John R. Czoykowski, Grosse Pointe Park, MI (US); Jonathan Hottenstein, Charlotte, NC (US)

(73) Assignee: GM Global Technology Operations, LLC, Detroit, MI (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/269,747

(22) Filed: Oct. 10, 2011

(65) Prior Publication Data

US 2012/0138406 A1    Jun. 7, 2012

Related U.S. Application Data

(60) Provisional application No. 61/419,093, filed on Dec. 2, 2010.

(51) Int. Cl.
  *F16H 61/688*  (2006.01)
  *F16D 25/10*  (2006.01)
  *F16H 61/28*  (2006.01)

(52) U.S. Cl.
  CPC .......... *F16H 61/2807* (2013.01); *F16H 61/688* (2013.01)
  USPC .................................. 192/48.601; 192/85.63

(58) Field of Classification Search
  USPC .................. 192/3.54, 3.58, 3.61, 3.63, 85.63, 192/48.601
  See application file for complete search history.

(56) References Cited

U.S. PATENT DOCUMENTS

| 3,774,475 | A  | 11/1973 | Meysenburg et al. |
| 3,834,499 | A  | 9/1974  | Candellero et al. |
| 4,589,295 | A  | 5/1986  | Jerry et al. |
| 4,653,352 | A  | 3/1987  | Nakao et al. |
| 4,944,202 | A  | 7/1990  | Gierer |
| 5,441,459 | A  | 8/1995  | Inukai et al. |
| 5,813,940 | A  | 9/1998  | Ramm et al. |
| 5,950,781 | A  | 9/1999  | Adamis et al. |
| 6,675,668 | B2 | 1/2004  | Schamscha |
| 6,698,304 | B2 | 3/2004  | Gierling et al. |
| 6,715,597 | B1 | 4/2004  | Buchanan et al. |
| 6,789,658 | B2 | 9/2004  | Busold et al. |
| 6,827,191 | B2 | 12/2004 | Kuhstrebe |

(Continued)

FOREIGN PATENT DOCUMENTS

| DE | 2141564 A1 | 2/1973 |
| DE | 4117736 C1 | 5/1992 |

(Continued)

*Primary Examiner* — Troy Chambers
*Assistant Examiner* — Ryan Dodd

(57) ABSTRACT

A hydraulic control system for a dual clutch transmission includes a plurality of pressure and flow control devices and logic valve assemblies in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the pressure control solenoids and the flow control solenoids allows for a pressurized fluid to activate at least one of the clutch actuators and synchronizer actuators in order to shift the transmission into a desired gear ratio.

9 Claims, 5 Drawing Sheets

(56) References Cited

U.S. PATENT DOCUMENTS

| | | |
|---|---|---|
| 6,883,394 B2 | 4/2005 | Koenig et al. |
| 6,941,830 B2 | 9/2005 | Ibamoto et al. |
| 7,044,013 B2 | 5/2006 | Ahrens |
| 7,048,672 B2 | 5/2006 | Bothe et al. |
| 7,300,375 B2 | 11/2007 | Petrzik |
| 7,401,689 B2 | 7/2008 | Hegerath et al. |
| 7,464,617 B2 | 12/2008 | Baldascini et al. |
| 7,464,618 B2 | 12/2008 | Mohlmann et al. |
| 7,472,616 B2 | 1/2009 | Dreher et al. |
| 7,478,572 B2 | 1/2009 | Maten et al. |
| 7,487,866 B2 | 2/2009 | Kruse et al. |
| 7,575,533 B2 | 8/2009 | Gumpoltsberger |
| 7,591,203 B2 | 9/2009 | Ochi et al. |
| 7,608,008 B2 | 10/2009 | Seo |
| 7,621,840 B2 | 11/2009 | Kamm et al. |
| 2001/0036878 A1 | 11/2001 | Itou et al. |
| 2002/0060113 A1 | 5/2002 | Harries |
| 2002/0119864 A1 | 8/2002 | Harries |
| 2003/0075408 A1 | 4/2003 | Alfredsson |
| 2003/0226416 A1 | 12/2003 | Umemoto et al. |
| 2004/0038765 A1 | 2/2004 | Fujimine et al. |
| 2005/0067251 A1 | 3/2005 | Braford et al. |
| 2005/0107214 A1 | 5/2005 | Koenig |
| 2005/0272559 A1 | 12/2005 | Bothe et al. |
| 2007/0175726 A1 | 8/2007 | Combes et al. |
| 2008/0108472 A1 | 5/2008 | Seo |
| 2008/0108474 A1 | 5/2008 | Seo |
| 2008/0207392 A1 | 8/2008 | Staudinger et al. |
| 2008/0210032 A1 | 9/2008 | Uberti et al. |
| 2008/0223683 A1 | 9/2008 | Grethel |
| 2008/0234093 A1 | 9/2008 | Diosi et al. |
| 2008/0242493 A1 | 10/2008 | Carey et al. |
| 2008/0305911 A1 | 12/2008 | Moorman et al. |
| 2009/0000897 A1 | 1/2009 | Staudinger et al. |
| 2009/0017963 A1 | 1/2009 | Hart et al. |
| 2009/0048061 A1 | 2/2009 | Hart et al. |
| 2009/0151495 A1 | 6/2009 | Garabello et al. |
| 2009/0157271 A1 | 6/2009 | Garabello et al. |
| 2009/0221394 A1 | 9/2009 | Phillips et al. |
| 2009/0247351 A1 | 10/2009 | Seo et al. |
| 2011/0138956 A1* | 6/2011 | Moorman .................. 74/473.11 |
| 2011/0139564 A1* | 6/2011 | Czoykowski et al. ... 192/48.601 |
| 2011/0180364 A1* | 7/2011 | Czoykowski et al. ..... 192/85.63 |

FOREIGN PATENT DOCUMENTS

| | | |
|---|---|---|
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102005050479 A1 | 5/2007 |
| DE | 102006005858 A1 | 8/2007 |
| DE | 102008008454 A1 | 9/2008 |
| DE | 102008058692 A1 | 6/2009 |
| EP | 0477564 A2 | 4/1992 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 1851466 A2 | 11/2007 |
| EP | 2151586 A2 | 2/2010 |
| FR | 2808065 A1 | 10/2001 |
| GB | 2415022 B | 7/2007 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2004015302 A1 | 2/2004 |
| WO | WO2004076225 A1 | 9/2004 |
| WO | WO2004097265 A1 | 11/2004 |
| WO | WO2005078319 A1 | 8/2005 |
| WO | WO2006094711 A1 | 9/2006 |
| WO | WO2007017012 A1 | 2/2007 |
| WO | WO2009037170 A1 | 3/2009 |
| WO | WO2009048649 A3 | 4/2009 |
| WO | WO2010028745 A2 | 3/2010 |

* cited by examiner

ELECTRO-HYDRAULIC CONTROL SYSTEM FOR A DUAL CLUTCH TRANSMISSION

CROSS-REFERENCE TO RELATED APPLICATIONS

This application claims priority to U.S. Provisional Application No. 61/419,093 filed on Dec. 2, 2010, which is hereby incorporated in its entirety herein by reference.

TECHNICAL FIELD

The invention relates to a control system for a dual clutch transmission, and more particularly to an electro-hydraulic control system having a plurality of solenoids and valves operable to actuate a plurality of actuators within the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a dual clutch transmission.

SUMMARY

A hydraulic control system for a dual clutch transmission includes a plurality of pressure and flow control devices and logic valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the pressure control solenoids and the flow control solenoids allows for a pressurized fluid to activate at least one of the clutch actuators and synchronizer actuators in order to shift the transmission into a desired gear ratio.

In one example of the hydraulic control system, the hydraulic control system includes an electric pump and an accumulator that provide a pressurized hydraulic fluid.

In another example of the hydraulic control system, the hydraulic control system includes two flow control devices operable to actuate the dual clutch.

In yet another example of the hydraulic control system, the hydraulic control system includes two pressure control devices, two flow control devices, and two logic valves operable to actuate the plurality of synchronizer assemblies.

In another example of the hydraulic control system, the hydraulic control system includes two pressure control devices and two flow control devices operable to actuate the dual clutch.

In yet another example of the hydraulic control system, the hydraulic control system includes two pressure control devices, two flow control devices, and three logic valves operable to actuate the plurality of synchronizer assemblies.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
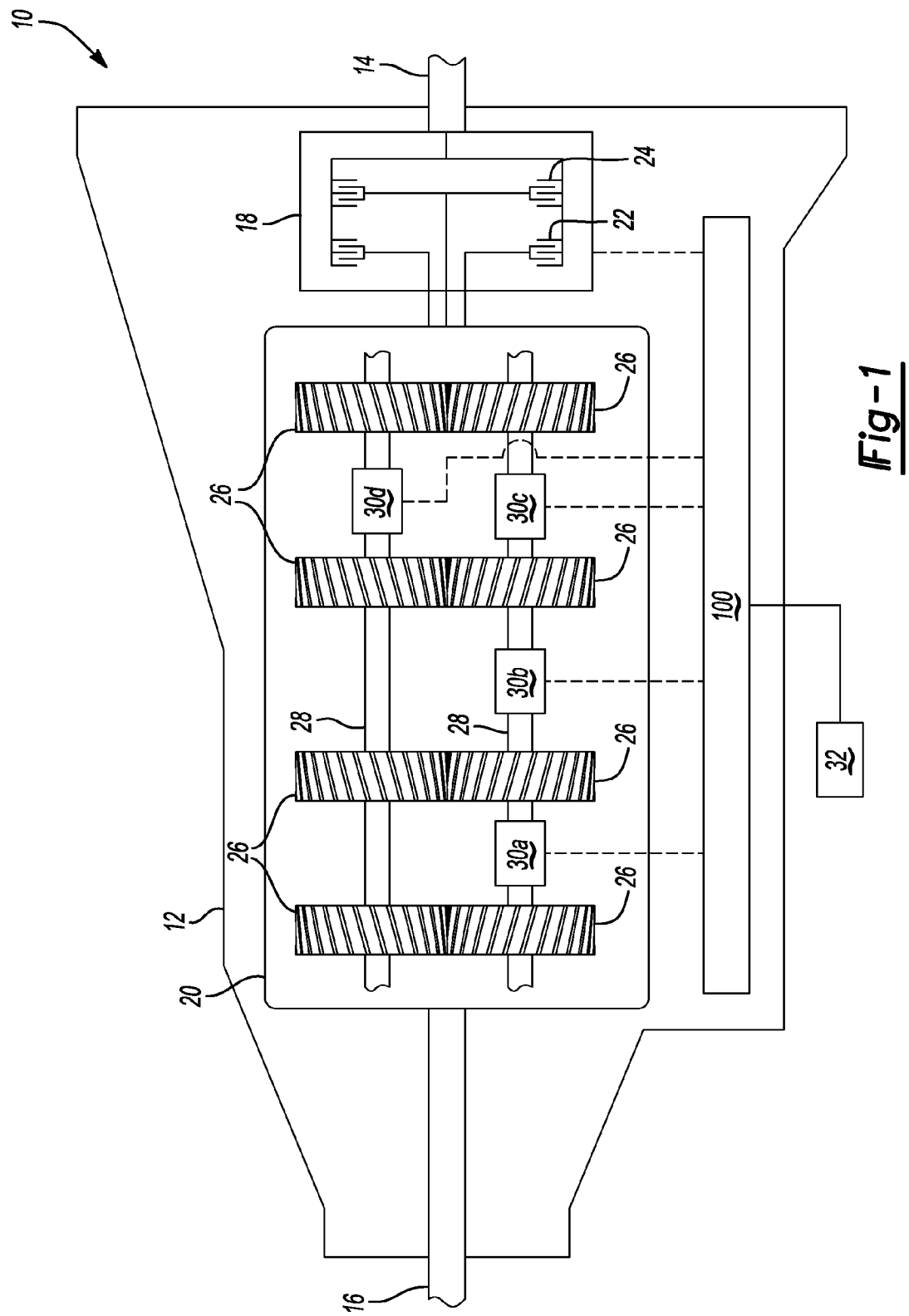
FIG. 1 is a schematic diagram of an exemplary dual clutch transmission having a hydraulic control system according.

With reference to FIG. 1, an exemplary dual clutch automatic transmission incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. While the housing 12 is illustrated as a typical rear wheel drive transmission, it should be appreciated that the transmission 10 may be a front wheel drive transmission or a rear wheel drive transmission without departing from the scope of the present invention. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are preferably dry clutches. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention. In the example provided, the transmission 10 provides seven forward gears and a reverse gear.

The gear arrangement 20 further includes a first synchronizer assembly 30A, a second synchronizer assembly 30B, a third synchronizer assembly 30C, and a fourth synchronizer assembly 30D. The synchronizer assemblies 30A-D are operable to selectively couple individual gears within the plurality of gear sets 26 to the plurality of shafts 28. Each synchronizer assembly 30A-D is disposed either adjacent certain single gears or between adjacent pairs of gears within adjacent gear sets 26. Each synchronizer assembly 30A-D, when activated, synchronizes the speed of a gear to that of a shaft and a positive clutch, such as a dog or face clutch. The clutch positively connects or couples the gear to the shaft. The clutch is bi-directionally translated by a shift rail and fork assembly (not shown) within each synchronizer assembly 30A-D.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-D via a hydraulic control system 100 according to the principles of the present invention.

Figure 2A:
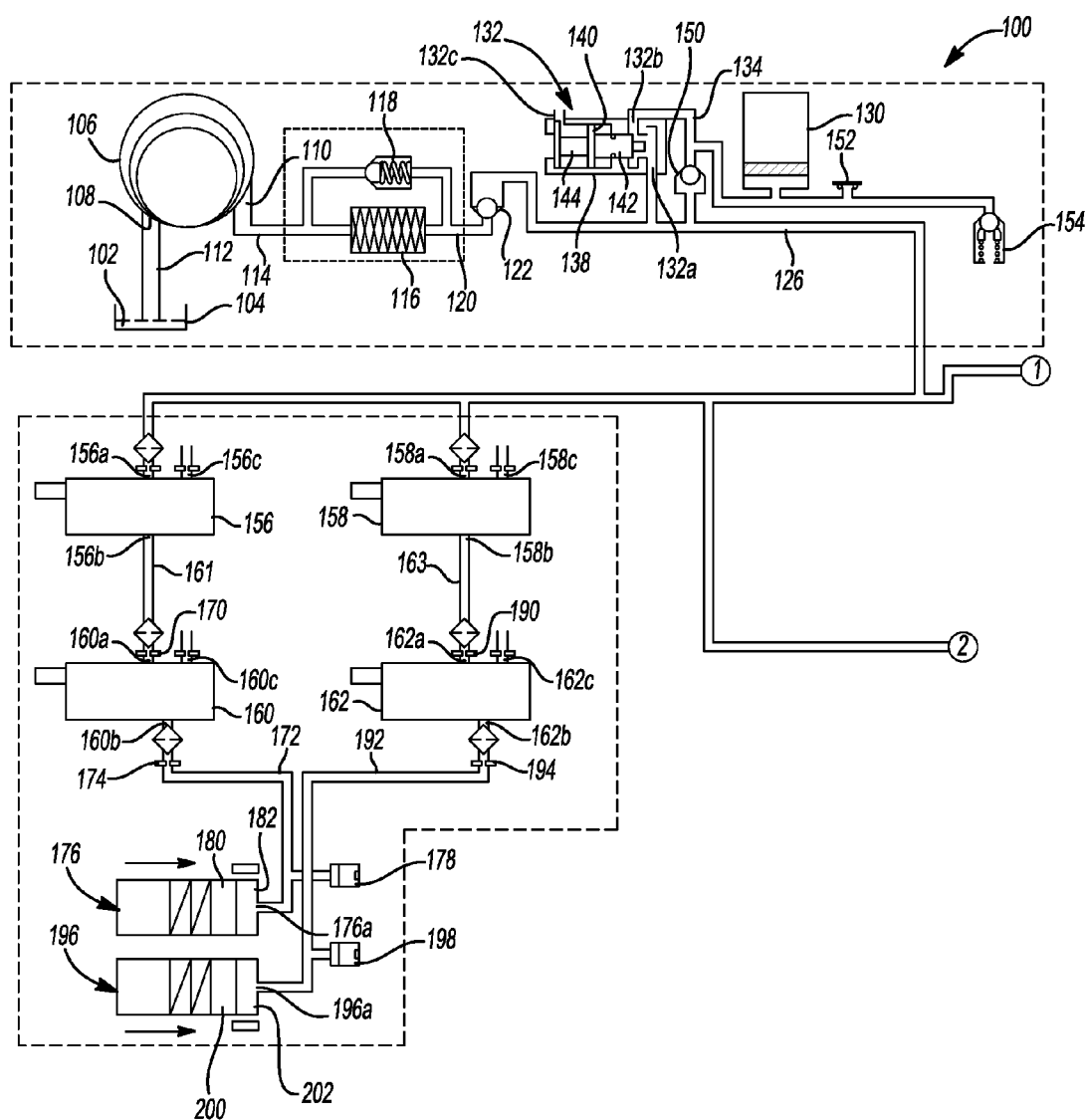
FIG. 2A is a first part of a schematic diagram of an embodiment of a hydraulic control system for a dual clutch transmission.
Figure 2B:
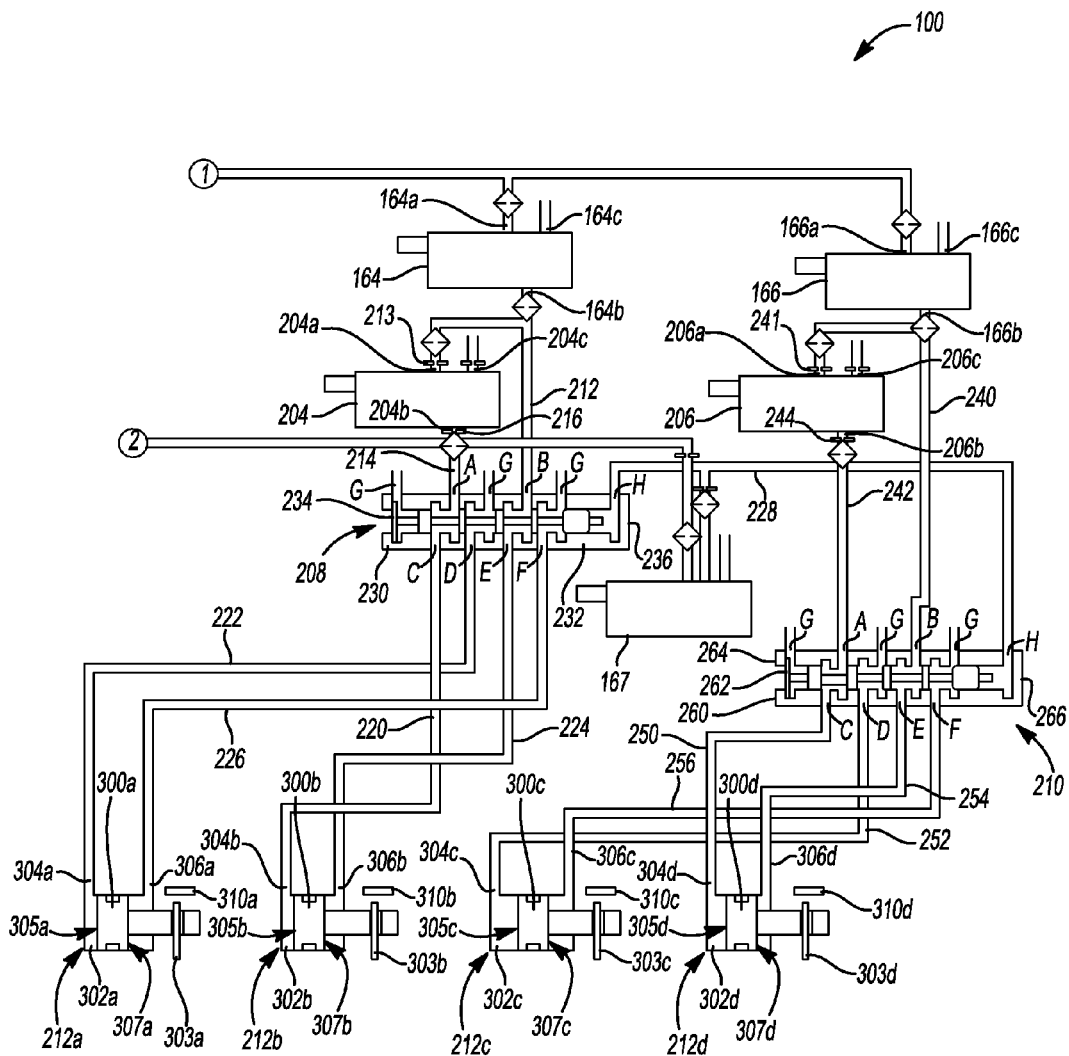
FIG. 2B is a second part of a schematic diagram of the hydraulic control system for a dual clutch transmission.

Turning to FIG. 2, the hydraulic control system 100 of the present invention is operable to selectively engage the dual clutch assembly 18 and the synchronizer assemblies 30A-D by selectively communicating a hydraulic fluid 102 from a sump 104 to a plurality of shift actuating devices, as will be described in greater detail below. The sump 104 is a tank or reservoir to which the hydraulic fluid 102 returns and collects from various components and regions of the automatic transmission 10. The hydraulic fluid 102 is forced from the sump 104 via a pump 106. The pump 106 is driven by an electric motor or a combustion engine (not shown) or any other type of prime mover. The pump 106 may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a pressure side filter 116 and a spring biased check valve 118. The pressure side filter 116 is disposed in parallel with the spring biased check valve 118. If the pressure side filter 116 becomes blocked or partially blocked, pressure within supply line 114 increases and opens the spring biased check valve 118 in order to allow the hydraulic fluid 102 to bypass the pressure side filter 116.

The pressure side filter 116 and the spring biased check valve 118 each communicate with an outlet line 120. The outlet line 120 is in communication with a check valve 122. The check valve 122 is in communication with a main supply line 126 and is configured to maintain hydraulic pressure within the main supply line 126. The main supply line 126 supplies pressurized hydraulic fluid to an accumulator 130 via an accumulator bypass valve assembly 132.

The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types, such as a gas-charged type, without departing from the scope of the present invention. The accumulator is in hydraulic fluid communication with an accumulator feed line 134.

The accumulator bypass valve assembly 132 is operable to allow selective fluid communication between the main supply line 126 and the accumulator feed line 134. The accumulator bypass valve assembly 132 includes an inlet port 132A, an outlet port 132B, and an exhaust port 132C. The inlet port 132A is in fluid communication with the main supply line 126. The outlet port 132B is in fluid communication with the accumulator feed line 134. The exhaust port 132C is in fluid communication with the sump 104 or an exhaust backfill circuit (not shown).

The accumulator bypass valve assembly 132 further includes a spool valve or piston 138 slidably disposed in a bore 140. The valve 138 is sealed to the bore 140 via at least one ring seal 142 or other type of seal. The valve 138 is moveable between at least two positions. In a first position, or de-stroked position (not shown), the outlet port 132B is cut off from the inlet port 132A by the valve 138. In a second position, or stroked position shown in FIG. 1, the outlet port 132B is in fluid communication with the inlet port 132A. The valve 138 is biased to the de-stroked position by a biasing member 144. The valve 138 is moved to the stroked position by hydraulic fluid 102 acting on an end of the valve 138 against the bias of the biasing member 144. The accumulator bypass valve assembly 132 is set to a minimum system hydraulic fluid pressure, as will be described below.

The accumulator feed line 134 also is in fluid communication with a one-way check valve 150, a pressure sensor 152, and a spring-biased blow off safety valve 154. The one-way check valve 150 allows fluid communication from the accumulator feed line 134 back to the main supply line 126 while preventing fluid communication from the main supply line 126 to the accumulator feed line 134. The pressure sensor 152 is configured to sense or otherwise determine a pressure of the hydraulic fluid 102 within the accumulator feed line 134. Finally, the spring biased blow-off safety valve 154 communicates with the sump 104 or with an exhaust backfill circuit (not shown). The spring biased blow-off safety valve 154 is set at a relatively high predetermined pressure and if the pressure of the hydraulic fluid 102 in the accumulator feed line 134 exceeds this pressure, the safety valve 154 opens momentarily to relieve and reduce the pressure of the hydraulic fluid 102.

The accumulator 130 is operable to supply pressurized hydraulic fluid 102 back to the main supply line 126 through the accumulator feed line 134 and the one-way check valve 150. Upon discharge of the accumulator 130, the check valve 122 prevents the pressurized hydraulic fluid 102 from returning to the pump 106. The accumulator 130, when charged, effectively replaces the pump 106 as the source of pressurized hydraulic fluid 102, thereby eliminating the need for the pump 106 to run continuously. The pressure sensor 152 reads the pressure of the hydraulic fluid 102 within the accumulator feed line 134 in real time and provides this data to the transmission control module 32. Accordingly, the transmission control module 32 can operate the pump 106 based on real-time conditions of the accumulator 130.

However, during a startup condition wherein the main supply line 126 and the accumulator 130 are not pressurized with the hydraulic fluid 102, the pump 106 is commanded to operate and a flow of pressurized hydraulic fluid 102 is drawn from the sump 104 to the main supply line 126. Initially, the pressure of the hydraulic fluid 102 within the main supply line 126 is insufficient to overcome the bias of the biasing member 144 of the accumulator bypass valve assembly 132. Accordingly, the valve 138 remains de-stroked, thereby cutting off the accumulator 130 from the main supply line 126. Therefore, the flow of pressurized hydraulic fluid 102 from the pump 106 is directed directly to the main supply line 126, providing system pressure to the hydraulic control system 100 and allowing the hydraulic control system 100 to operate effectively immediately after vehicle start. As the hydraulic control system 100 becomes saturated, the pressure within the main supply line 126 increases. The increasing pressure within the main supply line 126 creates a force on the distal end of the valve 138 and the valve 138 strokes against the biasing member 144 to the stroked position. Accordingly, the hydraulic fluid 102 communicates through the accumulator feed line 134 and charges the accumulator 130.

The main supply line 126 supplies pressurized hydraulic fluid 102 to a first clutch pressure control device 156, a second clutch pressure control device 158, a first pressure control device 164, a second pressure control device 166, and a valve control device 167.

The first clutch pressure control device 156 is preferably an electrically controlled variable force solenoid having an internal closed loop pressure control. Various makes, types, and models of solenoids may be employed with the present invention so long as the first pressure control device 156 is operable to control the pressure of the hydraulic fluid 102. The first pressure control device 156 includes an inlet port 156A that communicates with an outlet port 156B when the first pressure control device 156 is activated or energized and includes an exhaust port 156C that communicates with the outlet port 156B when the first pressure control device 156 is inactive or de-energized. Variable activation of the first pressure control device 156 regulates or controls the pressure of the hydraulic fluid 102 as the hydraulic fluid 102 communicates from the inlet port 156A to the outlet port 156B. The internal closed loop pressure control provides pressure feedback within the solenoid to adjust the amount of flow to the outlet port 156B based on a particular current command from the controller 32, thereby controlling pressure. The inlet port 156A is in communication with the main supply line 126. The outlet port 156B is in communication with an intermediate line 161. The exhaust port 156C is in communication with the sump 104 or an exhaust backfill circuit (not shown).

The intermediate line 161 communicates pressurized hydraulic fluid 102 from the first clutch pressure control device 156 to a first clutch flow control device 160. The first clutch flow control device 160 is preferably an electrically controlled variable force solenoid that is operable to control a flow of the hydraulic fluid 102 from the first clutch flow control device 160 in order to actuate the first torque transmitting device 22, as will be described in greater detail below. The first clutch flow control device 160 includes an inlet port 160A that communicates with an outlet port 160B when the first clutch flow control device 160 is energized to a current greater than a null point current (i.e., the zero forward/reverse flow point for the given current) and includes an exhaust port 160C that communicates with the outlet port 160B when the first clutch flow control device 160 is de-energized to a current less than the null point current. Variable activation of the first clutch flow control device 160 regulates or controls the flow of the hydraulic fluid 102 as the hydraulic fluid 102 communicates from the inlet port 160A to the outlet port 160B. The inlet port 160A is in communication with the main supply line 126 and an optional flow restriction orifice 170. The outlet port 160B is in communication with a first clutch supply line 172 and an optional flow restriction orifice 174. The exhaust port 160C is in communication with the sump 104 or an exhaust backfill circuit (not shown).

The first clutch supply line 172 is in fluid communication with an inlet/outlet port 176A in a first clutch piston assembly 176 and with a micro air bleed 178. The first clutch piston assembly 176 includes a single acting piston 180 slidably disposed in a cylinder 182. The piston 180 translates under hydraulic pressure to engage the first torque transmitting device 22, shown in FIG. 1. When the first clutch flow control device 160 is energized, a flow of pressurized hydraulic fluid 102 is provided to the first clutch supply line 172. The flow of pressurized hydraulic fluid 102 is communicated from the first clutch supply line 172 to the first clutch piston assembly 176 where the pressurized hydraulic fluid 102 translates the piston 180, thereby engaging the first torque transmitting device 22. When the first clutch flow control solenoid 160 is de-energized, the inlet port 160A is closed and hydraulic fluid from the cylinder 182 passes from the outlet port 160B to the exhaust port 160C and into the sump 104, thereby disengaging the first torque transmitting device 22. The translation of the piston 180 may be measured by a position sensor (not shown) for active control of torque transmitting device 22.

The second clutch pressure control device 158 is preferably an electrically controlled variable force solenoid having an internal closed loop pressure control. Various makes, types, and models of solenoids may be employed with the present invention so long as the second pressure control device 158 is operable to control the pressure of the hydraulic fluid 102. The second pressure control device 158 includes an inlet port 158A that communicates with an outlet port 158B when the second pressure control device 158 is activated or energized and includes an exhaust port 158C that communicates with the outlet port 158B when the second pressure control device 158 is inactive or de-energized. Variable activation of the second pressure control device 158 regulates or controls the pressure of the hydraulic fluid 102 as the hydraulic fluid 102 communicates from the inlet port 158A to the outlet port 158B. The internal closed loop pressure control provides pressure feedback within the solenoid to adjust the amount of flow to the outlet port 158B based on a particular current command from the controller 32, thereby controlling pressure. The inlet port 158A is in communication with the main supply line 126. The outlet port 158B is in communication with an intermediate line 163. The exhaust port 158C is in communication with the sump 104 or an exhaust backfill circuit (not shown).

The intermediate line 163 communicates pressurized hydraulic fluid 102 from the second clutch pressure control device 158 to a second clutch flow control device 162. The second clutch flow control device 162 is preferably an electrically controlled variable force solenoid that is operable to control a flow of the hydraulic fluid 102 from the second clutch flow control device 162 in order to actuate the second torque transmitting device 24, as will be described in greater detail below. The second clutch flow control device 162 includes an inlet port 162A that communicates with an outlet port 162B when the second clutch flow control device 162 is energized to a current greater than a null point current (i.e., the zero forward/reverse flow point for the given current) and includes an exhaust port 162C that communicates with the outlet port 162B when the second clutch flow control device 162 is de-energized to a current less than the null point current. Variable activation of the second clutch flow control device 162 regulates or controls the flow of the hydraulic fluid 102 as the hydraulic fluid 102 communicates from the inlet port 162A to the outlet port 162B. The inlet port 162A is in communication with the main supply line 126 and an optional flow restriction orifice 190. The outlet port 162B is in communication with a second clutch supply line 192 and an optional flow restriction orifice 194. The exhaust port 162C is in communication with the sump 104 or an exhaust backfill circuit (not shown).

The second clutch supply line 192 is in fluid communication with an inlet/outlet port 196A in a second clutch piston assembly 196 and a micro air bleed 198. The second clutch piston assembly 196 includes a single acting piston 200 slidably disposed in a cylinder 202. The piston 200 translates under hydraulic pressure to engage the second torque transmitting device 24, shown in FIG. 1. When the second clutch flow control device 162 is activated or energized, a flow of pressurized hydraulic fluid 102 is provided to the second clutch supply line 192. The flow of pressurized hydraulic fluid 102 is communicated from the second clutch supply line 192 to the second clutch piston assembly 196 where the pressurized hydraulic fluid 102 translates the piston 200, thereby engaging the second torque transmitting device 24. When the second clutch flow control solenoid 162 is de-energized, the inlet port 162A is closed and hydraulic fluid from the cylinder 202 passes from the outlet port 162B to the exhaust port 162C and into the sump 104, thereby disengaging the second torque transmitting device 24. The translation of the piston 200 may be measured by a position sensor (not shown) for active control of torque transmitting device 24.

The first and second pressure control devices 164 and 166 are operable to selectively provide flows of pressurized hydraulic fluid 102 through first and second flow control devices 204 and 206 and through first and second valve assemblies 208 and 210 in order to selectively actuate a plurality of synchronizer shift actuators. The synchronizer actuators include a first synchronizer actuator 212A, a second synchronizer actuator 212B, a third synchronizer actuator 212C, and a fourth synchronizer actuator 212D.

For example, the first pressure control device 164 is preferably an electrically controlled variable force solenoid having an internal closed loop pressure control. Various makes, types, and models of solenoids may be employed with the present invention so long as the first pressure control device 164 is operable to control the pressure of the hydraulic fluid 102. The first pressure control device 164 includes an inlet port 164A that communicates with an outlet port 164B when the first pressure control device 164 is activated or energized and includes an exhaust port 164C that communicates with the outlet port 164B when the first pressure control device 164 is inactive or de-energized. Variable activation of the first pressure control device 164 regulates or controls the pressure of the hydraulic fluid 102 as the hydraulic fluid 102 communicates from the inlet port 164A to the outlet port 164B. The internal closed loop pressure control provides pressure feedback within the solenoid to adjust the amount of flow to the outlet port 164B based on a particular current command from the controller 32, thereby controlling pressure. The inlet port 164A is in communication with the main supply line 126. The outlet port 164B is in communication with an intermediate line 212. The exhaust port 164C is in communication with the sump 104 or an exhaust backfill circuit (not shown).

The intermediate line 212 communicates pressurized hydraulic fluid 102 from the first pressure control device 164 to the first flow control device 204 and the first valve assembly 208. The first flow control device 204 is preferably an electrically controlled variable force solenoid. Various makes, types, and models of solenoids may be employed with the present invention so long as the first flow control device 204 is operable to control the flow of the hydraulic fluid 102. The first flow control device 204 includes an inlet port 204A that communicates with an outlet port 204B when the first flow control device 204 is energized to a current greater than a null point current (i.e., the zero forward/reverse flow point for the given current) and includes an exhaust port 204C that communicates with the outlet port 204B when the first flow control device 204 is de-energized to a current less than the null point current. Variable activation of the first flow control device 204 regulates or controls the flow of the hydraulic fluid 102 as the hydraulic fluid 102 communicates from the inlet port 204A to the outlet port 204B. The inlet port 204A is in communication with the intermediate line 212 through an optional flow restriction orifice 213. The outlet port 204B is in communication with an intermediate line 214 which communicates with the first valve assembly 208 through an optional flow restriction orifice 216. The exhaust port 204C is in communication with the sump 104 or an exhaust backfill circuit (not shown).

The first valve assembly 208 is operable to selectively direct the flows of pressurized hydraulic fluid 102 from the first pressure control device 164 and the first flow control device 204 to the first synchronizer actuator 212A and to the second synchronizer actuator 212B, as will be described in greater detail below. The first valve assembly 208 includes a first inlet port 208A, a second inlet port 208B, a first outlet port 208C, a second outlet port 208D, a third outlet port 208E, a fourth outlet port 208F, a plurality of exhaust ports 208G, and a control port 208H. The first inlet port 208A is in communication with the intermediate line 214. The second inlet port 208B is in communication with the intermediate line 212. The first outlet port 208C is in communication with a synchronizer supply line 220. The second outlet port 208D is in communication with a synchronizer supply line 222. The third outlet port 208E is in communication with a synchronizer supply line 224. The fourth outlet port 208F is in communication with a synchronizer supply line 226. The exhaust ports 208G are ultimately in communication with the sump 104 or an exhaust backfill circuit (not shown). The control port 208H is in communication with a control line 228 that communicates with the valve control device 167. The valve control device 167 is preferably a pressure control solenoid that is normally closed. However, it should be appreciated that other types of solenoids and other control devices may be employed without departing from the scope of the present invention, such as on-off solenoids.

The first valve assembly 208 further includes a valve spool 230 slidably disposed within a valve body or bore 232. The valve spool 230 is moveable between at least two positions by a biasing member 234 and by fluid flow channeled from the control device 167 via control line 228. The biasing member 234 is preferably a spring and acts on an end of the valve spool 230 to bias the valve spool 230 to the first position or de-stroked position. When the control device 167 is energized or activated a flow of the hydraulic fluid 102 is communicated to the control port 208H via control line 228 and into a control chamber 236 of valve assembly 208. The hydraulic fluid 102 acts on an end of the valve spool 230 to move the valve spool 230 and compress biasing member 234 to place valve spool 230 in the second position or stroked position. The supply of pressurized hydraulic fluid 102 is provided to the control device 167 via the main supply line 126, as noted above.

When the valve spool 230 is in the de-stroked position, the first inlet port 208A is in communication with the second outlet port 208D, the second inlet port 208B is in communication with the fourth outlet port 208F, and the first and third outlet ports 208C, 208E are in communication with exhaust ports 208G. When the valve spool 230 is in the stroked position, as shown in FIG. 2, the first inlet port 208A is in communication with the first outlet port 208C, the second inlet port 208B is in communication with the third outlet port 208E, and the second and fourth outlet ports 208D, 208F are in communication with exhaust ports 208G. Accordingly, when the valve control device 167 is opened, pressurized hydraulic fluid 102 flows from the first pressure control device 164 and a variable flow of hydraulic fluid 102 flows from the first flow control device 204 to the second synchronizer actuator 212B. When the valve control device 167 is closed, pressurized hydraulic fluid 102 flows from the first pressure control device 164 and a variable flow of hydraulic fluid 102 flows from the first flow control device 204 to the first synchronizer actuator 212A.

The second pressure control device 166 is preferably an electrically controlled variable force solenoid having an internal closed loop pressure control. Various makes, types, and models of solenoids may be employed with the present invention so long as the second pressure control device 166 is operable to control the pressure of the hydraulic fluid 102. The second pressure control device 166 includes an inlet port 166A that communicates with an outlet port 166B when the second pressure control device 166 is activated or energized and includes an exhaust port 166C that communicates with the outlet port 166B when the second pressure control device 166 is inactive or de-energized. Variable activation of the second pressure control device 166 regulates or controls the pressure of the hydraulic fluid 102 as the hydraulic fluid 102 communicates from the inlet port 166A to the outlet port 166B. The internal closed loop pressure control provides pressure feedback within the solenoid to adjust the amount of flow to the outlet port 166B based on a particular current command from the controller 32, thereby controlling pressure. The inlet port 166A is in communication with the main supply line 126. The outlet port 166B is in communication with an intermediate line 240. The exhaust port 166C is in communication with the sump 104 or an exhaust backfill circuit (not shown).

The intermediate line 240 communicates pressurized hydraulic fluid 102 from the second pressure control device 166 to the second flow control device 206 and the second valve assembly 210. The second flow control device 206 is preferably an electrically controlled variable force solenoid. Various makes, types, and models of solenoids may be employed with the present invention so long as the second flow control device 206 is operable to control the flow of the hydraulic fluid 102. The second flow control device 206 includes an inlet port 206A that communicates with an outlet port 206B when the second flow control device 206 is energized to a current greater than a null point current (i.e., the zero forward/reverse flow point for the given current) and includes an exhaust port 206C that communicates with the outlet port 206B when the second flow control device 206 is de-energized to a current less than the null point current. Variable activation of the second flow control device 206 regulates or controls the flow of the hydraulic fluid 102 as the hydraulic fluid 102 communicates from the inlet port 206A to the outlet port 206B. The inlet port 206A is in communication with the intermediate line 240 via an optional flow restriction orifice 241. The outlet port 206B is in communication with an intermediate line 242 via an optional flow restriction orifice 244 which communicates with the second valve assembly 210. The exhaust port 206C is in communication with the sump 104 or an exhaust backfill circuit (not shown).

The second valve assembly 210 is operable to selectively direct the flows of pressurized hydraulic fluid 102 from the second pressure control device 166 and the second flow control device 206 to the third synchronizer actuator 212C and to the fourth synchronizer actuator 212D, as will be described in greater detail below. The second valve assembly 210 includes a first inlet port 210A, a second inlet port 210B, a first outlet port 210C, a second outlet port 210D, a third outlet port 210E, a fourth outlet port 210F, a plurality of exhaust ports 210G, and a control port 210H. The first inlet port 210A is in communication with the intermediate line 242. The second inlet port 210B is in communication with the intermediate line 240. The first outlet port 210C is in communication with a synchronizer supply line 250. The second outlet port 210D is in communication with a synchronizer supply line 252. The third outlet port 210E is in communication with a synchronizer supply line 254. The fourth outlet port 210F is in communication with a synchronizer supply line 256. The exhaust ports 210G are in communication with the sump 104 or an exhaust backfill circuit (not shown). The control port 210H is in communication with the control line 228 that communicates with the control device 167.

The second valve assembly 210 further includes a valve spool 260 slidably disposed within a valve body or bore 262. The valve spool 260 is moveable between at least two positions by a biasing member 264 and by hydraulic fluid 102 channeled from the control device 167 via control line 228. The biasing member 264 is preferably a spring and acts on an end of the valve spool 260 to bias the valve spool 260 to the first position or de-stroked position. When the control device 167 is energized or activated a flow of the hydraulic fluid 102 is communicated to the control port 210H via control line 228 and into a control chamber 266 of valve assembly 210. The hydraulic fluid 102 acts on an end of the valve spool 260 to move the valve spool 260 and compress the biasing member 264 to place valve spool 260 in the second position or stroked position.

When the valve spool 260 is in the de-stroked position, the first inlet port 210A is in communication with the second outlet port 210D, the second inlet port 210B is in communication with the fourth outlet port 210F, and the first and third outlet ports 210C, 210E are in communication with exhaust ports 210G. When the valve spool 260 is in the stroked position, as shown in FIG. 2, the first inlet port 210A is in communication with the first outlet port 210C, the second inlet port 210B is in communication with the third outlet port 210E, and the second and fourth outlet ports 210D, 210F are in communication with exhaust ports 210G. Accordingly, when the valve control device 167 is opened, pressurized hydraulic fluid 102 flows from the second pressure control device 166 and a variable flow of hydraulic fluid 102 flows from the second flow control device 206 to the fourth synchronizer actuator 212D. When the valve control device 167 is closed, pressurized hydraulic fluid 102 flows from the second pressure control device 166 and a variable flow of hydraulic fluid 102 flows from the second flow control device 206 to the third synchronizer actuator 212C.

The synchronizer actuators 212A-D are preferably two-area piston assemblies operable to each engage or actuate a shift rail in a synchronizer assembly, but can be three-area piston assemblies without departing from the scope of the present invention. For example, the first synchronizer actuator 212A is operable to actuate the first synchronizer assembly 30A, the second synchronizer actuator 212B is operable to actuate the second synchronizer assembly 30B, the third synchronizer actuator 212C is operable to actuate the third synchronizer assembly 30C, and the fourth synchronizer actuator 212D is operable to actuate the fourth synchronizer assembly 30D.

The first synchronizer actuator 212A includes a piston 300A slidably disposed within a piston housing or cylinder 302A. The piston 300A presents two separate areas for pressurized hydraulic fluid to act upon. The piston 300A engages or contacts a finger lever, shift fork, or other shift rail component 303A of the first synchronizer assembly 30A. The first synchronizer actuator 212A includes a fluid port 304A that communicates with a first end 305A of the piston 300A and a fluid port 306A that communicates with an opposite second end 307A of the piston 300A having a smaller contact area than the first end 305A. Fluid port 304A is in communication with the synchronizer supply line 222 and fluid port 306A is in communication with the synchronizer supply line 226. Accordingly, the pressurized hydraulic fluid 102 communicated from the first pressure control device 164 enters the first synchronizer actuator 212A through the fluid port 306A and contacts the second end 307A of the piston 300A and the flow of hydraulic fluid 102 from the first flow control device 204 enters the first synchronizer actuator 212A through the fluid port 304A and contacts the first end 305A of the piston 300A. The difference in the force generated by pressure of the hydraulic fluid 102 delivered to fluid port 306A from the first pressure control device 164 acting on end 307A and the force generated by the pressure of hydraulic fluid 102 delivered to fluid port 304A from the first flow control device 204 acting on end 305A moves the piston 300A between various positions. Each position in turn corresponds to a position of the shift rail of the first synchronizer assembly 30A (i.e., engaged left, engaged right, and neutral). A fork position sensor 310A may be included to communicate to the controller 32 the position of the shift fork 303A.

The second synchronizer actuator 212B includes a piston 300B slidably disposed within a piston housing or cylinder 302B. The piston 300B presents two separate areas for pressurized hydraulic fluid to act upon. The piston 300B engages or contacts a finger lever, shift fork, or other shift rail component 303B of the second synchronizer assembly 30B. The second synchronizer actuator 212B includes a fluid port 304B that communicates with a first end 305B of the piston 300B and a fluid port 306B that communicates with an opposite second end 307B of the piston 300B having a smaller contact area than the first end 305B. Fluid port 304B is in communication with the synchronizer supply line 220 and fluid port 306B is in communication with the synchronizer supply line 224. Accordingly, the pressurized hydraulic fluid 102 communicated from the first pressure control device 164 enters the second synchronizer actuator 212B through the fluid port 306B and contacts the second end 307B of the piston 300B and the flow of hydraulic fluid 102 from the first flow control device 204 enters the first synchronizer actuator 212B through the fluid port 304B and contacts the first end 305B of the piston 300B. The difference in the force generated by pressure of the hydraulic fluid 102 delivered to fluid port 306B from the first pressure control device 164 acting on end 307B and the force generated by the pressure of hydraulic fluid 102 delivered to fluid port 304B from the first flow control device 204 acting on end 305B moves the piston 300B between various positions. Each position in turn corresponds to a position of the shift rail of the second synchronizer assembly 30B (i.e., engaged left, engaged right, and neutral). A fork position sensor 310B may be included to communicate to the controller 32 the position of the shift fork 303B.

The third synchronizer actuator 212C includes a piston 300C slidably disposed within a piston housing or cylinder 302C. The piston 300C presents two separate areas for pressurized hydraulic fluid to act upon. The piston 300C engages or contacts a finger lever, shift fork, or other shift rail component 303C of the third synchronizer assembly 30C. The third synchronizer actuator 212C includes a fluid port 304C that communicates with a first end 305C of the piston 300C and a fluid port 306C that communicates with an opposite second end 307C of the piston 300C having a smaller contact area than the first end 305C. Fluid port 304C is in communication with the synchronizer supply line 252 and fluid port 306C is in communication with the synchronizer supply line 256. Accordingly, the pressurized hydraulic fluid 102 communicated from the second pressure control device 166 enters the third synchronizer actuator 212C through the fluid port 306C and contacts the second end 307C of the piston 300C and the flow of hydraulic fluid 102 from the second flow control device 206 enters the third synchronizer actuator 212C through the fluid port 304C and contacts the first end 305C of the piston 300C. The difference in the force generated by pressure of the hydraulic fluid 102 delivered to fluid port 306C from the second pressure control device 166 acting on end 307C and the force generated by the pressure of hydraulic fluid 102 delivered to fluid port 304C from the second flow control device 206 acting on end 305C moves the piston 300C between various positions. Each position in turn corresponds to a position of the shift rail of the third synchronizer assembly 30C (i.e., engaged left, engaged right, and neutral). A fork position sensor 310C may be included to communicate to the controller 32 the position of the shift fork 303C.

The fourth synchronizer actuator 212D includes a piston 300D slidably disposed within a piston housing or cylinder 302D. The piston 300D presents two separate areas for pressurized hydraulic fluid to act upon. The piston 300D engages or contacts a finger lever, shift fork, or other shift rail component 303D of the fourth synchronizer assembly 30D. The fourth synchronizer actuator 212D includes a fluid port 304D that communicates with a first end 305D of the piston 300D and a fluid port 306D that communicates with an opposite second end 307D of the piston 300D having a smaller contact area than the first end 305D. Fluid port 304D is in communication with the synchronizer supply line 250 and fluid port 306D is in communication with the synchronizer supply line 254. Accordingly, the pressurized hydraulic fluid 102 communicated from the second pressure control device 166 enters the fourth synchronizer actuator 212D through the fluid port 306D and contacts the second end 307D of the piston 300D and the flow of hydraulic fluid 102 from the second flow control device 206 enters the fourth synchronizer actuator 212D through the fluid port 304D and contacts the first end 305D of the piston 300D. The difference in the force generated by pressure of the hydraulic fluid 102 delivered to fluid port 306D from the second pressure control device 166 acting on end 307D and the force generated by the pressure of hydraulic fluid 102 delivered to fluid port 304D from the second flow control device 206 acting on end 305D moves the piston 300D between various positions. Each position in turn corresponds to a position of the shift rail of the fourth synchronizer assembly 30D (i.e., engaged left, engaged right, and neutral). A fork position sensor 310D may be included to communicate to the controller 32 the position of the shift fork 303D.

During general operation of the hydraulic control system 100, the accumulator 130 provides the pressurized hydraulic fluid 102 throughout the system and the pump 106 is employed to charge the accumulator 130. Selection of a particular forward or reverse gear ratio is achieved by first selectively actuating one of the synchronizer assemblies 30A-D and then selectively actuating one of the torque transmitting devices 22, 24. It should be appreciated that the combination of selective engagement of the synchronizer assemblies 30A-D and torque transmitting devices 22, 24 providing a forward or reverse gear ratio may vary without departing from the scope of the present invention.

Generally, the first pressure control device 164 selectively provides pressurized hydraulic fluid 102 to each of the synchronizer actuators 212A-B while the first flow control device 204 selectively provides a flow of pressurized hydraulic fluid 102 to each of the synchronizer actuators 212A-B. The second pressure control device 166 selectively provides pressurized hydraulic fluid 102 to each of the synchronizer actuators 212C-D while the second flow control device 206 selectively provides a flow of pressurized hydraulic fluid 102 to each of the synchronizer actuators 212C-D. Individual synchronizer actuators 212A-D are actuated by controlling a flow from one of the flow control devices 204 and 206 based upon positioning of the first and second valve assemblies 208 and 210.

For example, to actuate the first synchronizer assembly 30A, the first pressure control device 164 is energized to provide a pressure on the piston 300A and to provide a flow of hydraulic fluid 102 to the first flow control device 204. Bi-directional translation of the first synchronizer assembly 30A is then achieved by selectively energizing the first flow control device 204. For example, energizing the first flow control device 204 to provide a flow of hydraulic fluid 102 to the synchronizer actuator 212A which provides a pressure acting on end 305A that is sufficient to overcome the force generated by the pressure acting on the end 307A from the first pressure control device 164 moves the piston 300A to a first engaged position. After controlling the piston 300A back to neutral typically through closed loop position control, energizing the first flow control device 204 to provide a flow of hydraulic fluid 102 to the synchronizer actuator 212A which provides a pressure acting on the end 305A that is balanced with the force generated by the pressure acting on the end 307A from the first pressure control device 164 maintains the piston 300A in a neutral or unengaged position. Energizing to a current less than the null point of the solenoid, the first flow control device 204 exhausts a flow of hydraulic fluid 102 to the synchronizer actuator 212A which provides a pressure acting on the end 305A that is insufficient to overcome the force generated by the pressure acting on the end 307A from the first pressure control device 164 moves the piston 300A to a second engaged position.

To actuate the second synchronizer assembly 30B, the first pressure control device 164 is energized to provide a pressure on the piston 300B and to provide a flow of hydraulic fluid 102 to the first flow control device 204. Bi-directional translation of the second synchronizer assembly 30B is then achieved by selectively energizing the first flow control device 204. For example, energizing the first flow control device 204 to provide a flow of hydraulic fluid 102 to the synchronizer actuator 212B which provides a pressure acting on end 305B that is sufficient to overcome the force generated by the pressure acting on the end 307B from the first pressure control device 164 moves the piston 300B to a first engaged position. After controlling the piston 300B back to neutral typically through closed loop position control, energizing the first flow control device 204 to provide a flow of hydraulic fluid 102 to the synchronizer actuator 212B which provides a pressure acting on the end 305B that is balanced with the force generated by the pressure acting on the end 307B from the first pressure control device 164 maintains the piston 300B in a neutral or unengaged position. Energizing to a current less than the null point of the solenoid, the first flow control device 204 exhausts a flow of hydraulic fluid 102 to the synchronizer actuator 212B which provides a pressure acting on the end 305B that is insufficient to overcome the force generated by the pressure acting on the end 307B from the first pressure control device 164 moves the piston 300B to a second engaged position.

To actuate the third synchronizer assembly 30C, the second pressure control device 166 is energized to provide a pressure on the piston 300C and to provide a flow of hydraulic fluid 102 to the second flow control device 206. Bi-directional translation of the third synchronizer assembly 30C is then achieved by selectively energizing the second flow control device 206. For example, energizing the second flow control device 206 to provide a flow of hydraulic fluid 102 to the synchronizer actuator 212C which provides a pressure acting on end 305C that is sufficient to overcome the force generated by the pressure acting on the end 307C from the second pressure control device 166 moves the piston 300C to a first engaged position. After controlling the piston 300C back to neutral typically through closed loop position control, energizing the second flow control device 206 to provide a flow of hydraulic fluid 102 to the synchronizer actuator 212C which provides a pressure acting on the end 305C that is balanced with the force generated by the pressure acting on the end 307C from the second pressure control device 166 maintains the piston 300C in a neutral or unengaged position. Energizing to a current less than the null point of the solenoid, the second flow control device 206 exhausts a flow of hydraulic fluid 102 to the synchronizer actuator 212C which provides a pressure acting on the end 305C that is insufficient to overcome the force generated by the pressure acting on the end 307C from the second pressure control device 166 moves the piston 300C to a second engaged position.

To actuate the fourth synchronizer assembly 30D, the second pressure control device 166 is energized to provide a pressure on the piston 300D and to provide a flow of hydraulic fluid 102 to the second flow control device 206. Bi-directional translation of the fourth synchronizer assembly 30D is then achieved by selectively energizing the second flow control device 206. For example, energizing the second flow control device 206 to provide a flow of hydraulic fluid 102 to the synchronizer actuator 212D which provides a pressure acting on end 305D that is sufficient to overcome the force generated by the pressure acting on the end 307D from the second pressure control device 166 moves the piston 300D to a first engaged position. After controlling the piston 300D back to neutral typically through closed loop position control, energizing the second flow control device 206 to provide a flow of hydraulic fluid 102 to the synchronizer actuator 212D which provides a pressure acting on the end 305D that is balanced with the force generated by the pressure acting on the end 307D from the second pressure control device 166 maintains the piston 300D in a neutral or unengaged position. Energizing to a current less than the null point of the solenoid, the second flow control device 206 exhausts a flow of hydraulic fluid 102 to the synchronizer actuator 212D which provides a pressure acting on the end 305D that is insufficient to overcome the force generated by the pressure acting on the end 307D from the second pressure control device 166 moves the piston 300D to a second engaged position.

To engage or actuate the first torque transmitting device 22, the first clutch pressure control device 156 and the first clutch flow control device 160 are energized. To engage or actuate the second torque transmitting device 24, the second clutch pressure control device 158 and the second clutch flow control device 162 is energized. Typically the engagement is monitored and controlled with position sensors (not shown).

The components of the hydraulic control system 100 are connected via a plurality of fluid communication lines, as described above. It should be appreciated that the fluid communication lines may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention. The valve assemblies described above are illustrated as spool valve assembly having multiple ports. However, it should be appreciated that other specific types of valves having greater or fewer ports may be provided without departing from the scope of the present invention. Finally, it should be appreciated that the source of pressurized hydraulic fluid, i.e. the accumulator 130 and the electrically driven pump 106 may be replaced by alternate hydraulic fluid sources, such as an engine driven pump.

By using hydraulic fluid flow to control actuation of the clutches 22 and 24 and the synchronizer assemblies 30A-D, the hydraulic control system 100 is operable to provide direct clutch position control, direct synchronizer actuator position control, and variable clutch and synchronizer actuator position control. At the same time, quick clutch response times are enabled, spin losses are reduced, and packaging space of the hydraulic control system 100 is reduced, all of which contributes to improved fuel economy and performance. The hydraulic control system 100 is also compatible with BAS/BAS+ hybrid systems. Finally, failure mode protection is enabled through pre-staged position control of the control devices 160, 162, 164, 166, 167, 204, and 206 and the valves 208 and 210.

Figure 3A:
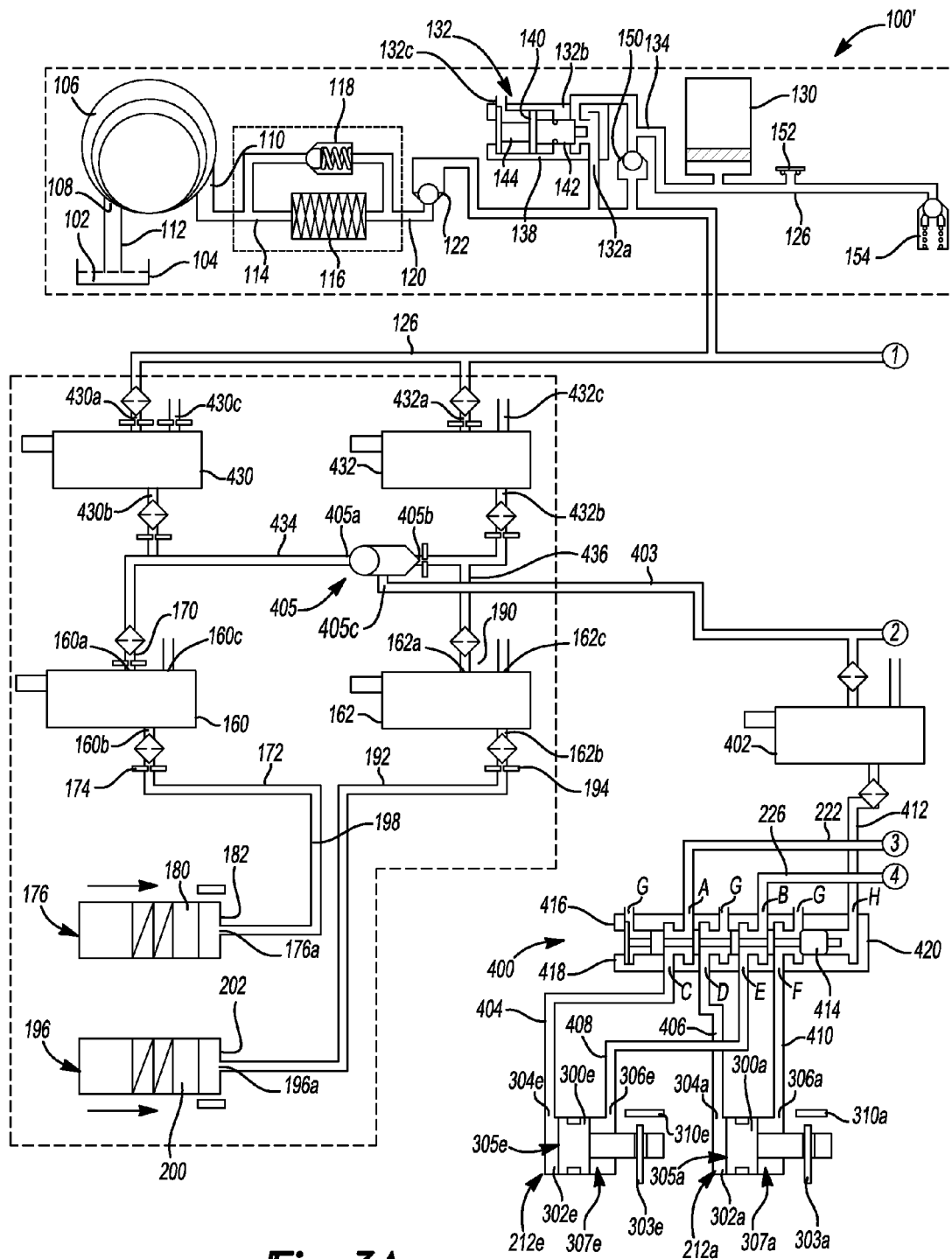
FIG. 3A is a first part of a schematic diagram of another embodiment of a hydraulic control system for a dual clutch transmission.
Figure 3B:
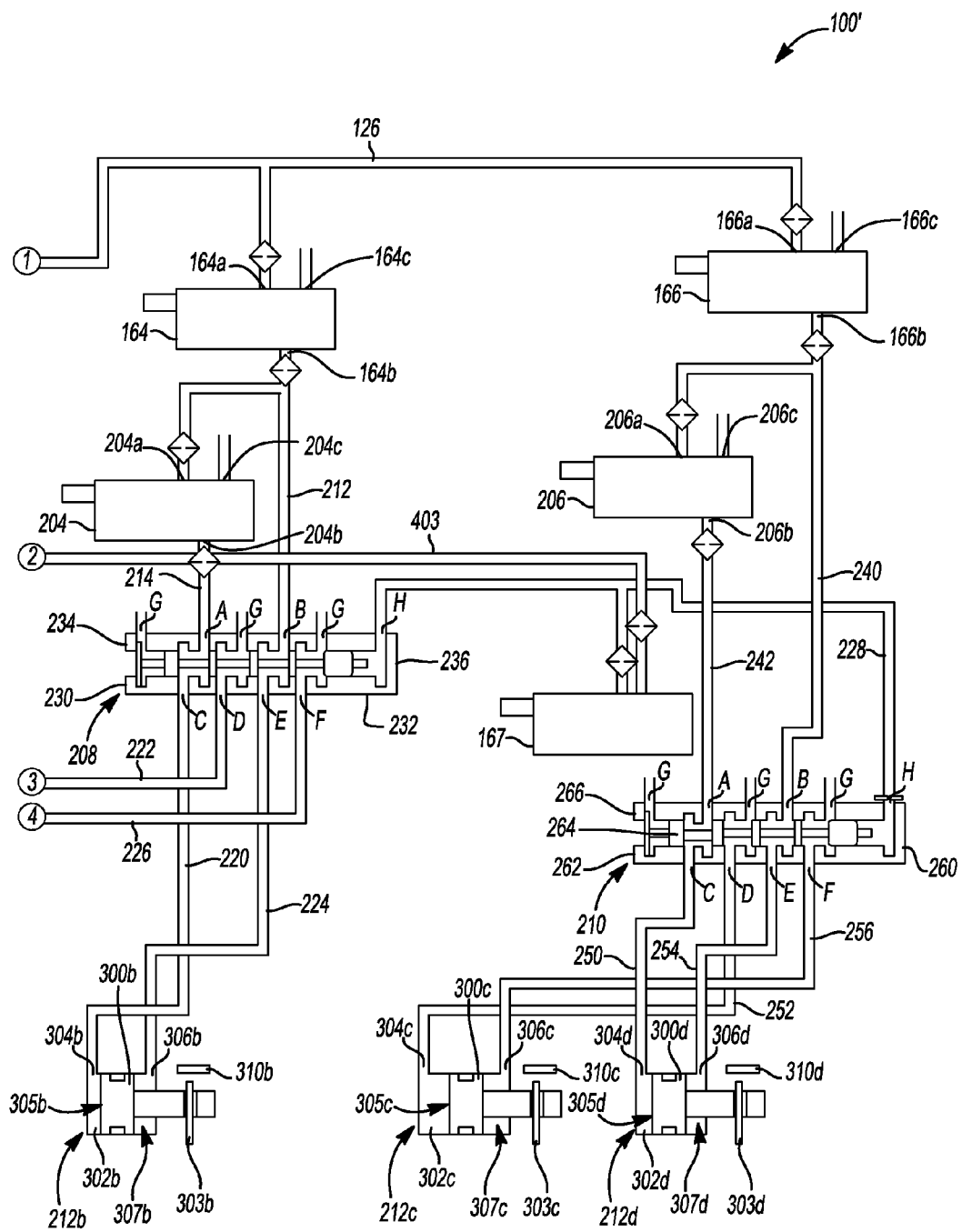
FIG. 3B is a second part of a schematic diagram of the hydraulic control system for a dual clutch transmission.

Turning to FIG. 3, an alternate embodiment of the hydraulic control system 100 is generally indicated by reference number 100'. The hydraulic control system 100' is similar to the hydraulic control system 100 shown in FIG. 2 and therefore like components are indicated by like reference numbers. However, in the hydraulic control system 100' the synchronizer actuators 212B and 212C are single sided synchronizers therefore requiring an additional synchronizer actuator 212E. To control the additional synchronizer actuator 212E, a third valve assembly 400 is disposed between the first valve assembly 210 and the synchronizer actuator 212E and synchronizer actuator 212A. An additional valve control device 402 is included to control the third valve assembly 400. Valve control devices 167 and 402 are decoupled from the main supply line 126 and instead receive pressurized hydraulic fluid 102 from a valve supply line 403. The valve supply line 403 is in turn in fluid communication with a ball valve assembly 405. The ball valve assembly 405 is in fluid communication with the hydraulic controls of the dual clutch 18, as will be described in greater detail below.

The third valve assembly 400 is operable to selectively direct the flows of pressurized hydraulic fluid 102 from the first pressure control device 164 and the first flow control device 204 via the first valve assembly 208 to the first synchronizer actuator 212A and to the fifth synchronizer actuator 212E, as will be described in greater detail below. The third valve assembly 400 includes a first inlet port 400A, a second inlet port 400B, a first outlet port 400C, a second outlet port 400D, a third outlet port 400E, a fourth outlet port 400F, a plurality of exhaust ports 400G, and a control port 400H. The first inlet port 400A is in communication with the fluid line 222. The second inlet port 400B is in communication with the fluid line 226. The first outlet port 400C is in communication with a synchronizer supply line 404. The second outlet port 400D is in communication with a synchronizer supply line 406. The third outlet port 400E is in communication with a synchronizer supply line 408. The fourth outlet port 400F is in communication with a synchronizer supply line 410. The exhaust ports 400G are in communication with the sump 104 or an exhaust backfill circuit (not shown). The control port 400H is in communication with a control line 412 that communicates with the valve control device 402. The valve control device 402 is preferably an pressure control solenoid that is normally closed. However, it should be appreciated that other types of solenoids and other control devices may be employed without departing from the scope of the present invention, such as an on-off solenoid.

The third valve assembly 400 further includes a valve spool 414 slidably disposed within a valve body or bore 416. The valve spool 414 is moveable between at least two positions by a biasing member 418 and by hydraulic fluid 102 channeled from the control device 402 via control line 412. The biasing member 418 is preferably a spring and acts on an end of the valve spool 414 to bias the valve spool 414 to the first position or de-stroked position. When the control device 402 is energized or activated a flow of the hydraulic fluid 102 is communicated to the control port 400H via control line 412 and into a control chamber 420 of valve assembly 400. The hydraulic fluid 102 acts on an end of the valve spool 414 to move the valve spool 414 and compress the biasing member 418 to place valve spool 414 in the second position or stroked position.

When the valve spool 414 is in the de-stroked position (shown in FIG. 3), the first inlet port 400A is in communication with the second outlet port 400D, the second inlet port 400B is in communication with the fourth outlet port 400F, and the first and third outlet ports 400C, 400E are in communication with exhaust ports 400G. When the valve spool 414 is in the stroked position, the first inlet port 400A is in communication with the first outlet port 400C, the second inlet port 400B is in communication with the third outlet port 400E, and the second and fourth outlet ports 400D, 400F are in communication with exhaust ports 400G. Accordingly, when the valve control device 402 is opened, the valve spool 414 strokes and pressurized hydraulic fluid 102 flows from the first pressure control device 164 and a variable flow of hydraulic fluid 102 flows from the first flow control device 204 to the fifth synchronizer actuator 212E. When the valve control device 402 is closed, the valve spool 414 de-strokes and pressurized hydraulic fluid 102 flows from the first pressure control device 164 and a variable flow of hydraulic fluid 102 flows from the first flow control device 204 to the first synchronizer actuator 212A. The configuration of the fifth synchronizer actuator 212E and operation thereof is substantially similar to the synchronizer actuators 212A-D described above and includes a piston 300A, a piston housing or cylinder 302A, a finger lever, shift fork, or other shift rail component 303A, a fluid port 304A, a first end 305A of the piston 300A, a fluid port 306A, an opposite second end 307A of the piston 300A, and a fork position sensor 310A.

In addition to the above described features, the hydraulic control system 100' includes two additional pressure control devices 430 and 432. The pressure control devices 430 and 432 provide pressurized hydraulic fluid to the first clutch flow control device 160 and the second clutch flow control device 162, respectively, and each provide pressurized hydraulic fluid to the ball valve assembly 405.

The pressure control device 430 is preferably an electrically controlled variable force solenoid having an internal closed loop pressure control. Various makes, types, and models of solenoids may be employed with the present invention so long as the pressure control device 430 is operable to control the pressure of the hydraulic fluid 102. The pressure control device 430 includes an inlet port 430A that communicates with an outlet port 430B when the pressure control device 430 is activated or energized and includes an exhaust port 430C that communicates with the outlet port 430B when the first pressure control device 430 is inactive or de-energized. Variable activation of the first pressure control device 430 regulates or controls the pressure of the hydraulic fluid 102 as the hydraulic fluid 102 communicates from the inlet port 430A to the outlet port 430B. The internal closed loop pressure control provides pressure feedback within the solenoid to adjust the amount of flow to the outlet port 430B based on a particular current command from the controller 32, thereby controlling pressure. The inlet port 430A is in communication with the main supply line 126. The outlet port 430B is in communication with an intermediate line 434. The intermediate line 434 is in fluid communication with the inlet port 160A of the first clutch flow control device 160 and the ball valve assembly 405. The exhaust port 430C is in communication with the sump 104 or an exhaust backfill circuit (not shown).

The pressure control device 432 is preferably an electrically controlled variable force solenoid having an internal closed loop pressure control. Various makes, types, and models of solenoids may be employed with the present invention so long as the pressure control device 432 is operable to control the pressure of the hydraulic fluid 102. The pressure control device 432 includes an inlet port 432A that communicates with an outlet port 432B when the pressure control device 432 is activated or energized and includes an exhaust port 432C that communicates with the outlet port 432B when the first pressure control device 432 is inactive or de-energized. Variable activation of the first pressure control device 432 regulates or controls the pressure of the hydraulic fluid 102 as the hydraulic fluid 102 communicates from the inlet port 432A to the outlet port 432B. The internal closed loop pressure control provides pressure feedback within the solenoid to adjust the amount of flow to the outlet port 432B based on a particular current command from the controller 32, thereby controlling pressure. The inlet port 432A is in communication with the main supply line 126. The outlet port 432B is in communication with an intermediate line 436. The intermediate line 436 is in fluid communication with the inlet port 160A of the first clutch flow control device 160 and with the ball valve assembly 405. The exhaust port 432C is in communication with the sump 104 or an exhaust backfill circuit (not shown).

The ball valve assembly 405 includes a first inlet 405A in fluid communication with the intermediate line 434, a second inlet 405B in fluid communication with the intermediate line 436, and an outlet 405C in fluid communication with the valve supply line 403. The ball valve assembly 405 closes off whichever of the inlets 405A and 405B is providing the lower pressurized hydraulic fluid 102 and allows communication between whichever of the inlets 405A and 405B is providing the higher pressurized hydraulic fluid 102 to communicate with the outlet 405C, thereby providing the valve control devices 167 and 402 with a constant supply of pressurized hydraulic fluid 102.

The hydraulic control system 100' operates in a manner similar to the hydraulic control system 100. Generally, the first pressure control device 164 selectively provides pressurized hydraulic fluid 102 to each of the synchronizer actuators 212A, 212B, and 212E while the first flow control device 204 selectively provides a flow of pressurized hydraulic fluid 102 to each of the synchronizer actuators 212A, 212B, and 212E. The second pressure control device 166 selectively provides pressurized hydraulic fluid 102 to each of the synchronizer actuators 212C-D while the second flow control device 206 selectively provides a flow of pressurized hydraulic fluid 102 to each of the synchronizer actuators 212C-D. Individual synchronizer actuators 212A-E are actuated by controlling a flow from one of the flow control devices 204 and 206 based upon positioning of the first, second, and third valve assemblies 208, 210, and 400.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for controlling a dual clutch transmission having a plurality of synchronizers, the hydraulic control system comprising:
    a source for providing a pressurized hydraulic fluid;
    first, second, third, and fourth pressure control solenoids in downstream fluid communication with the source;
    a first flow control solenoid in downstream fluid communication with the first pressure control solenoid;
    a second flow control solenoid in downstream fluid communication with the second pressure control solenoid;
    a first clutch actuator in downstream fluid communication with the first flow control solenoid for selectively actuating a first clutch of the dual clutch transmission;
    a second clutch actuator in downstream fluid communication with the second flow control solenoid for selectively actuating a second clutch of the dual clutch transmission;
    a third flow control solenoid in downstream fluid communication with the third pressure control solenoid;
    a fourth flow control solenoid in downstream fluid communication with the fourth pressure control solenoid;
    a first logic valve assembly in downstream fluid communication with the third flow control solenoid and the third pressure control solenoid, wherein the first logic control valve assembly has a valve spool movable between a first and a second position;
    a second logic valve assembly in downstream fluid communication with the fourth flow control solenoid and the fourth pressure control solenoid, wherein the second logic control valve assembly has a valve spool movable between a first and a second position;
    a first actuator in downstream fluid communication with the first logic valve assembly, wherein the first actuator is movable between a first, second and third position to selectively engage or disengage a first of the plurality of synchronizers when the valve spool of the first logic control valve assembly is in the first position;
    a second actuator in downstream fluid communication with the first logic valve assembly, wherein the second actuator is movable between a first, second and third position to selectively engage or disengage a second of the plurality of synchronizers when the valve spool of the first logic control valve assembly is in the second position;
    a third actuator in downstream fluid communication with the second logic valve assembly, wherein the third actuator is movable between a first, second and third position to selectively engage or disengage a third of the plurality of synchronizers when the valve spool of the second logic control valve assembly is in the first position; and a fourth actuator in downstream fluid communication with the second logic valve assembly, wherein the fourth actuator is movable between a first, second and third position to selectively engage or disengage a fourth of the plurality of synchronizers when the valve spool of the second logic control valve assembly is in the second position, and wherein the third pressure control solenoid generates a first hydraulic fluid pressure and the third flow control solenoid varies hydraulic fluid flow to at least one of the first and second actuators to move at least one of the first and second actuators into at least one of the first, second, and third positions and wherein the fourth pressure control solenoid generates a second hydraulic fluid pressure and the fourth flow control solenoid varies hydraulic fluid flow to at least one of the third and fourth actuators to move at least one of the third and fourth actuators into at least one of the first, second, and third positions.

2. The hydraulic control system of claim 1 further comprising a fifth pressure control solenoid in downstream fluid communication with the source of pressurized hydraulic fluid and in upstream fluid communication with the first and second logic valve assemblies.

3. The hydraulic control system of claim 2 wherein the fifth control solenoid is configured to communicate a third pressurized hydraulic fluid from the source to the first and second logic valve assemblies in order to move each of the valve spools of the first and second logic valve assemblies to the second positions.

4. The hydraulic control system of claim 1 wherein the source includes a pump, an accumulator, and a bypass valve disposed in series between the pump and the accumulator, wherein the bypass valve selectively interrupts communication between the pump and the accumulator.

5. A hydraulic control system for controlling a dual clutch transmission and a plurality of synchronizers in a transmission, the hydraulic control system comprising:

a source for providing a pressurized hydraulic fluid;

first, second, third, and fourth pressure control solenoid each having an inlet port in downstream fluid communication with the source and each having an outlet port;

a first flow control solenoid having an inlet port in downstream fluid communication with the outlet port of the first pressure control solenoid and having an outlet port;

a second flow control solenoid having an inlet port in downstream fluid communication with the outlet port of the second pressure control solenoid and having an outlet port;

a first clutch actuator in downstream fluid communication with the outlet port of the first flow control solenoid, the first clutch actuator configured to selectively actuate a first clutch of the dual clutch transmission;

a second clutch actuator in downstream fluid communication with the outlet port of the second flow control solenoid, the second clutch actuator configured to selectively actuate a second clutch of the dual clutch transmission;

a third flow control solenoid having an inlet port in downstream fluid communication with the outlet port of the third pressure control solenoid and having an outlet port;

a fourth flow control solenoid having an inlet port in downstream fluid communication with the outlet port of the fourth pressure control solenoid and having an outlet port;

a first logic valve assembly in downstream fluid communication with the outlet port of the third flow control solenoid and the outlet port of the third pressure control solenoid, wherein the first logic control valve assembly has a valve spool movable between a first and a second position;

a second logic valve assembly in downstream fluid communication with the outlet port of the fourth flow control solenoid and the outlet port of the fourth pressure control solenoid, wherein the second logic control valve assembly has a valve spool movable between a first and a second position;

a first actuator in downstream fluid communication with the first logic valve assembly, wherein the first actuator is movable between a first, second and third position when the valve spool of the first logic control valve assembly is in the first position;

a second actuator in downstream fluid communication with the first logic valve assembly, wherein the second actuator is movable between a first, second and third position when the valve spool of the first logic control valve assembly is in the second position;

a third actuator in downstream fluid communication with the second logic valve assembly, wherein the third actuator is movable between a first, second and third position when the valve spool of the second logic control valve assembly is in the first position; and a fourth actuator in downstream fluid communication with the second logic valve assembly, wherein the fourth actuator is movable between a first, second and third position when the valve spool of the second logic control valve assembly is in the second position, wherein the third pressure control solenoid generates a first hydraulic fluid pressure and the third flow control solenoid varies hydraulic fluid flow to at least one of the first and second actuators to move at least one of the first and second actuators into at least one of the first, second, and third positions and wherein the fourth pressure control solenoid generates a second hydraulic fluid pressure and the fourth flow control solenoid varies hydraulic fluid flow to at least one of the third and fourth actuators to move at least one of the third and fourth actuators into at least one of the first, second, and third positions, and wherein each of the first, second, third, and fourth actuators is configured to position a synchronizer between at least two engaged positions and a neutral position and wherein the first and second positions of each of the first, second, third, and fourth actuators corresponds to one of the neutral and engaged positions of the synchronizer.

6. The hydraulic control system of claim 5 further comprising a fifth pressure control solenoid in downstream fluid communication with the source of pressurized hydraulic fluid and in upstream fluid communication with the first and second logic valve assemblies.

7. The hydraulic control system of claim 6 wherein the fifth control solenoid is configured to communicate a third pressurized hydraulic fluid from the source to the first and second logic valve assemblies in order to move each of the valve spools of the first and second logic valve assemblies to the second positions.

8. The hydraulic control system of claim 6 wherein the source includes a pump, an accumulator, and a bypass valve disposed in series between the pump and the accumulator, wherein the bypass valve selectively interrupts communication between the pump and the accumulator.

9. The hydraulic control system of claim 6 wherein the first, second, third, and fourth actuators are moved between their first and second positions by moving the valve spools of the first and second logic valve assemblies and varying the first and second flows of hydraulic fluid to either overcome or not overcome a force generated by each of the first and second pressurized hydraulic fluids acting on each of the first, second, third, and fourth actuators.

* * * * *